Dec. 16, 1952
J. R. RILEY
2,621,752
COMPRESSED GAS DEHYDRATOR
Filed Dec. 20, 1948
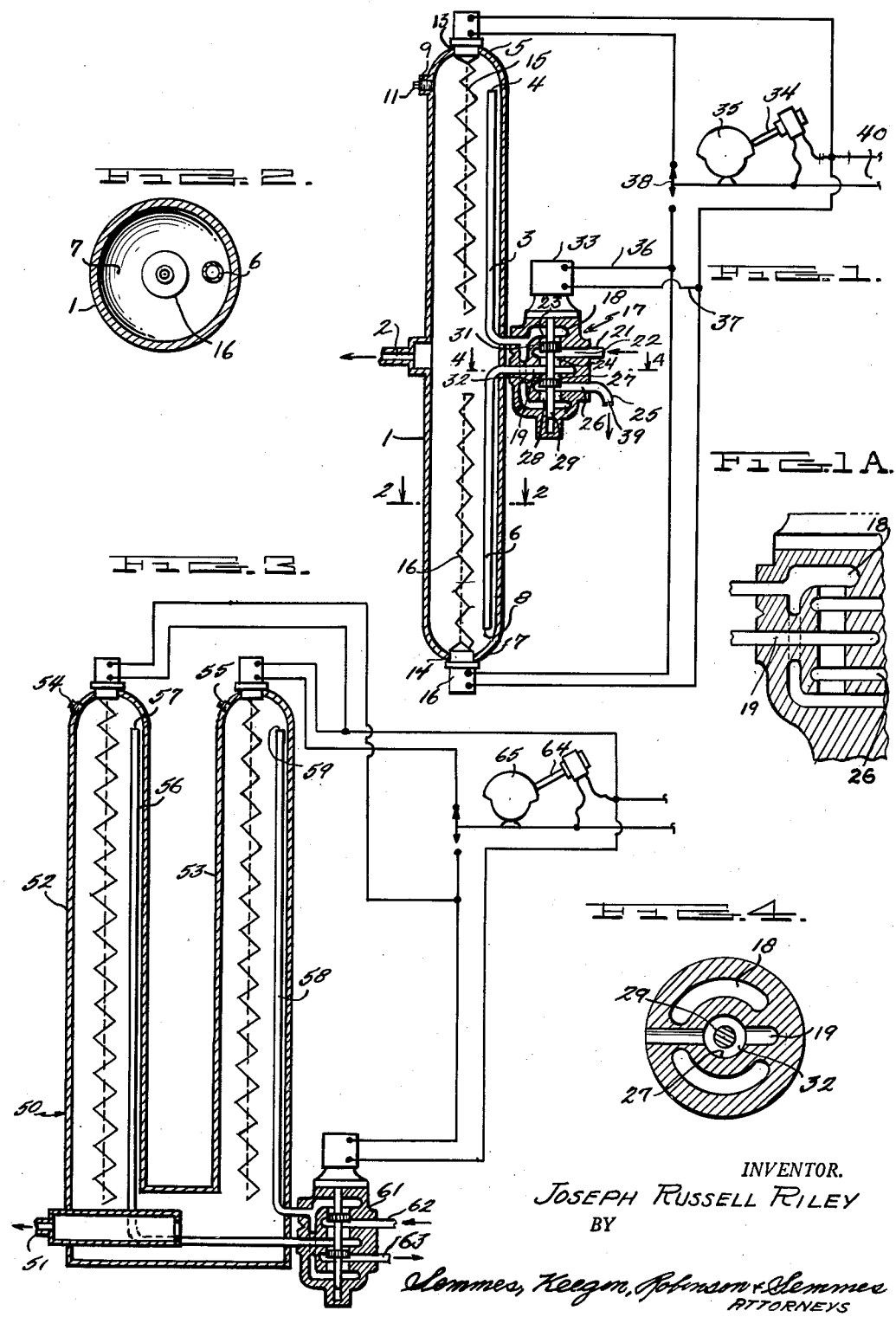
INVENTOR.
JOSEPH RUSSELL RILEY
BY
Semmes, Keegin, Johnson & Semmes
ATTORNEYS Patented Dec. 16, 1952

2,621,752

UNITED STATES PATENT OFFICE 2,621,752

COMPRESSED GAS DEHYDRATOR

Joseph Russell Riley, Catonsville, Md., assignor to The Davison Chemical Corporation, Baltimore, Md.

Application December 20, 1948, Serial No. 66,385

11 Claims. (Cl. 183—4.7)

This invention relates to a gas dehydrator and more particularly to a dehydrator having a single bed of a moisture absorbent material adapted for continuous use.

The gas dehydrators ordinarily consist of a plurality of containers containing a moisture absorbent material for removing moisture from the gas. In the usual procedure one of the containers will be "on stream" and will remove moisture from the gas passing through it and discharge it for use. Meanwhile, the absorbent material in the other containers is subjected to a reactivating treatment to make it suitable for removal of moisture from gases. Ordinarily, the pressure is reduced in the containers of absorbent material being reactivated to atmospheric pressure to facilitate the reactivation.

It is an object of this invention to provide a compact dehydrator capable of continuous use.

Another object of this invention is to provide a method of continuously activating the absorbent in a gas dehydrator by bleeding a portion of the gas through a heated body of dehydrating material.

Another object of this invention is to provide a single bed gas dehydrator suitable for continuous use.

Still another object of this invention is to provide a method of dehydrating a gas in which the dehydrated material is reactivated under pressure to allow continuous operation of the dehydrator.

With these and other objects in view, as will become apparent in the following detailed description, this invention resides in a dehydrator consisting of a casing having a moisture absorbent material therein. The casing is provided with conduits opening therein, spaced from one another, and a gas outlet from the casing between the openings of the conduits. Valve means directing the flow of gas inwardly through one conduit and outwardly to a gas exhaust through the other conduit may be reversed to allow reversal of the direction of flow in the conduits. Heating means within the casing heat the portion of the absorbent material through which gas flows to a conduit and outwardly through the conduit to the exhaust. A timer simultaneously reverses the setting of the valve means and the operation of the heating means whereby each portion of the absorbent passes through alternating dehydrating and activating periods.

In the drawings:

Figure 1 is a longitudinal sectional view of a gas dehydrator constructed according to this invention;

Figure 1a is a fragmentary longitudinal sectional view of the gas control valve.

Figure 2 is a transverse sectional view along the section line 2—2 in Figure 1 illustrating the position of a heating element and gas conduit within the dehydrator;

Figure 3 is a longitudinal sectional view of a modified form of this invention adapted for use in installations in which the head room is limited; and, Figure 4 is a cross-sectional view along the line 4—4 in Figure 1 of the valve employed for the control of gas through the dehydrator.

Referring to Figure 1 of the drawings, a dehydrator is illustrated having a casing 1 preferably cylindrical in shape and made of steel, having an outlet 2 near its center for connection with an air line for delivery of the air to the point of use. A conduit 3 passes through the shell of the casing and extends longitudinally therethrough to open at 4 near one end 5 of the dehydrator. A similar conduit 6 also passes through the shell of the casing near its center and extends longitudinally through the dehydrator to the end 7 opposite the end 5 of the casing. The conduit 6 is open at its end 8 for introduction of the gas into the casing at its lower end 7.

Casing 1 is provided with a port 9, ordinarily closed with a plug 11, for the loading of an absorbent material in the dehydrator. Many different absorbent materials may be used of the type that may be reactivated by heating. Silica gel and activated alumina are especially efficient adsorbents suitable for use in the apparatus of this invention, and will ordinarily be employed in the dehydrator. The term absorbent is used herein to designate both material taking up water on its surface, commonly known as adsorbents, and the conventional water absorbent materials.

The casing 1 is also provided with openings 13 and 14 at its upper and lower ends, respectively, for the reception of heating elements 15 and 16. Each of the heating elements 15 and 16 extends through approximately one-half the length of the casing for activation of the absorbent within the casing between the outlet 2 and the openings 4 and 8 of the conduits 3 and 6, respectively. The heating elements are conventional electrical heating units suitable for use with the particular absorbent material employed.

The conduits 3 and 6 pass outwardly through the shell of the casing 1 for connection with a control valve, indicated generally by 17. The conduit 3 is suitably connected to the valve and communicates with an outer chamber 18, best shown in Figure 1a within the valve. Conduit 6 is similarly connected to the valve and communicates with a central chamber 19. A gas supply line 21 communicates with a duct 22 within valve 17 which allows flow to the outer chamber 18 and inner chamber 19 through ports 23 and 24, respectively. A gas exhaust 25 communicates with a duct 26 within the valve allowing flow to the inner chamber 19 and outer chamber 18 through ports 27 and 28. In the particular valve illustrated in the drawings, the ports 23, 24, 27 and 28 are in alignment and provide a bearing surface guiding a valve stem 29. The valve stem is provided with discs 31 and 32 adapted to open and close the ports and control the flow of gas through the valve.

The operation of the valve 17 is effected by a solenoid 33, the operation of which is controlled in turn by a timer motor 34 and cam 35 arrangement through suitable electrical leads 36 and 37. The timer 34 and cam 35 actuates a double throw switch 38 which alternately makes and breaks the circuit to the solenoid 33, and each of the heating elements 15 and 16. The motor 34 and leads 36 and 37 are connected to a source of electrical power 40. While a solenoid operated valve is described for purposes of illustration, clearly other means of actuating valve 17, such as hydraulic pressure, may be used.

For the description of the operation of the gas dehydrator comprising this invention, the valve is assumed to be in the position illustrated in Figure 1 of the drawings. The gas, under pressure, passes from the supply line 21 into the duct 22 and then through the port 24 to the inner chamber 19. Flow from duct 22 into the chamber 18 is prevented by disc 31 which closes port 23. The gas flows from the inner chamber 19 through conduit 6 and is discharged at the lower end of the casing 1 from the opening 8 at the end of conduit 6. The gas discharged from the opening 8 passes upward through the absorbent material in the casing 1, is dried by contact with the absorbent, and is discharged through the outlet 2.

The control valve 17, when in the position illustrated in Figure 1, allows gas to flow through the conduit 3 to the exhaust 25. This gas will enter the conduit 3 at the opening 4 at the upper end of the casing and pass through the conduit to the outer chamber 18. The gas passes through the outer chamber to the port 28 and then to the duct 26 communicating with the gas exhaust 25. The gas exhaust 25 is equipped with an orificed plug 39 which controls the amount of gas bled from the dehydrator to the conduit 3 to the exhaust 25.

During the period when the gas flows outward through the conduit 3 the timer controls the electrical circuits to operate the heating element 15. Thus, the absorbent material within the upper half of the casing is heated and any moisture present is removed therefrom. The flow of the gas bled through the gas exhaust 25 sweeps the moisture liberated from the absorbent material with it and discharges it to the atmosphere.

Ordinarily, the outlet 2 of the dehydrator casing 1 is connected to apparatus which is under pressure. The dehydrator of this invention allows a portion of the absorbent material to be reactivated while under pressure. In most instances the amount of gas bled from the dehydrator through the gas exhaust will be only a small fraction of the gas introduced into the dehydrator.

After a given period, determined partly by the moisture content of the gas being treated, the timer 34 and cam 35 will reverse the double throw switch 38 to pass a current through the solenoid 33. The valve stem 29 is then forced downward to move the discs 31 and 32 to close the ports 24 and 28. The gas may then flow from the duct 22 through the port 23 to the chamber 18. The gas flows upward through the conduit 3 to the opening 4 and downward throughout the activated absorbent material to the outlet 2 of the casing. Meanwhile, a small quantity of gas, determined by the size of the orifice 39, is bled through conduit 6, inner chamber 19, port 27, and ducts 26 to the gas exhaust 25.

A modified form of this invention especially adapted for use when the head room is limited is illustrated in Figure 3 of the drawings. In this form of the invention, the dehydrator casing, indicated generally by 50, is substantially U-shaped with the gas outlet 51 at the base of the U. The legs 52 and 53 of the U are filled through openings 54 and 55, respectively, with a suitable moisture absorbent material. As in the form of the invention illustrated in Figure 1, the openings 54 and 55 are closed with plugs.

A conduit 56 passes through the shell of the casing 50, extends upwardly through the leg 52 to open at its upper end 57. A similar conduit 58 passes through the shell of the casing 50 and terminates at 59 at the upper end of leg 53. The conduits 56 and 58 are connected with a valve 61 similar to that described for the form of the invention illustrated in Figure 1, which controls the flow from a gas supply line 62 and to an exhaust 63. The operation of the valve 61 is similar to that of valve 17 and is controlled by a timer 64 and cam 65 element to alternate the dehydrating and activating processes in the legs of the U. The gas dehydrator illustrated in Figure 3 has a moisture absorbing capacity approximately twice that of the dehydrator illustrated in Figure 1, and yet requires approximately the same head room.

The gas dehydrator described herein allows continuous dehydration of gas in a single bed of dehydrating material. The novel dehydrator of this invention makes it possible to maintain the absorbent under a constant pressure during both the absorption of moisture from the gas and the reactivation of the spent absorbent.

While this invention has been described in detail with respect to a particular modification of the invention, it is to be understood that the concept of this invention is not limited to those details, but is determined by the scope of the appended claims.

I claim:

1. A gas dehydrator comprising a dehydrator casing, a mass of absorbent material within the casing, a first conduit opening into the casing near one end of the mass of absorbent material, a second conduit opening into the casing at an end of the absorbent material spaced from the opening of the first conduit, an outlet in the casing for dehydrated gas, said outlet spaced from and positioned between the openings of the conduits into the casing, a moist gas supply line and a gas exhaust line, valve means adapted to direct gas flow alternately from the moist gas supply line through the first conduit into the casing to the dehydrated gas outlet and a portion of the gas thus dehydrated from within the casing to the gas exhaust line through the second conduit, and then from the moist gas supply line through the second conduit to the dehydrated gas outlet and from the casing through the first conduit to the gas exhaust line, heating means in the casing between the dehydrated gas outlet and the inlet of each of the conduits, and means to actuate the heating means between the opening of the conduit in communication with the gas exhaust line and the dehydrated gas outlet whereby a portion of the absorbent is used to dehydrate the gas while the remainder of the absorbent is being reactivated by the passage of gas thereover at an elevated temperature.

2. A gas dehydrator comprising a dehydrator casing, a mass of absorbent material within the casing, a first conduit opening into the casing near one end of the mass of absorbent material, a second conduit opening into the casing at an end of the absorbent material spaced from the opening of the first conduit, an outlet in the casing for dehydrated gas, said outlet spaced from and positioned between the openings of the conduits into the casing, a moist gas supply line and a gas exhaust line, valve means adapted to direct gas flow alternately from the moist gas supply line through the first conduit into the casing to the dehydrated gas outlet and a portion of the gas thus dehydrated from within the casing to the gas exhaust line through the second conduit and then from the moist gas supply line through the second conduit to the dehydrated gas outlet and from the casing through the first conduit to the gas exhaust line, heating means in the casing between the dehydrated gas outlet and the inlet of each of the conduits, means to actuate the heating means between the opening of the conduit in communication with the gas exhaust line and the dehydrated gas outlet whereby a portion of the absorbent is used to dehydrate the gas while the remainder of the absorbent is being reactivated by the passage of gas thereover at an elevated temperature, and a timer periodically reversing the direction of flow of the gas in the conduit and the operation of the heating means.

3. A gas dehydrator comprising a dehydrator casing, a mass of absorbent material within the casing, a first conduit opening into the casing near one end of the mass of absorbent material, a second conduit opening into the casing at an end of the absorbent material spaced from the opening of the first conduit, an outlet in the casing for dehydrated gas, said outlet spaced from and positioned between the openings of the conduits into the casing, a moist gas supply line and a gas exhaust line, solenoid operated valve means adapted to allow flow alternately from the moist gas supply line through the first conduit into the casing to the dehydrated gas outlet and a portion of the gas thus dehydrated from within the casing to the gas exhaust line through the second conduit and then from the moist gas supply line through the second conduit to the dehydrated gas outlet and from the casing through the first conduit to the gas exhaust line, heating means in the casing between the dehydrated gas outlet and the inlet of each of the conduits, and means to actuate the heating means between the opening of the conduit in communication with the gas exhaust line and the dehydrated gas outlet whereby a portion of the absorbent is used to dehydrate the gas while the remainder of the absorbent is being reactivated by the passage of gas thereover at an elevated temperature.

4. A gas dehydrator comprising a dehydrator casing, a mass of absorbent material within the casing, a first conduit opening into the casing near one end of the mass of absorbent material, a second conduit opening into the casing at an end of the absorbent material spaced from the opening of the first conduit, an outlet in the casing for dehydrated gas, said outlet spaced from and positioned between the openings of the conduits into the casing, a moist gas supply line and a gas exhaust line, valve means adapted to allow flow alternately from the moist gas supply line through the first conduit into the casing to the dehydrated gas outlet and a portion of the gas thus dehydrated from within the casing to the gas exhaust line through the second conduit and then from the moist gas supply line through the second conduit to the dehydrated gas outlet and from the casing through the first conduit to the gas exhaust line, heating means in the casing between the dehydrated gas outlet and the inlet of each of the conduits, and a timer periodically operating the valve means to reverse the flow in the conduits, said timer adapted and arranged to actuate the heater element adjacent the conduit in communication with the gas exhaust line.

5. A gas dehydrator comprising a dehydrator casing, a mass of absorbent material within the casing, a first conduit opening into the casing near one end of the mass of absorbent material, a second conduit opening into the casing at an end of the absorbent material spaced from the opening of the first conduit, an outlet in the casing for dehydrated gas, said outlet spaced from and positioned between the openings of the conduits into the casing, a moist gas supply line and a gas exhaust line, valve means adapted to allow flow alternately from the moist gas supply line through the first conduit into the casing to the dehydrated gas outlet and a portion of the gas thus dehydrated from within the casing to the gas exhaust line through the second conduit and then from the moist gas supply line through the second conduit to the dehydrated gas outlet and from the casing through the first conduit to the gas exhaust line, heating means in the casing between the dehydrated gas outlet and the inlet of each of the conduits, means to actuate the heating means between the opening of the conduit in communication with the gas exhaust line and the dehydrated gas outlet whereby a portion of the absorbent is used to dehydrate the gas while the remainder of the absorbent is being reactivated by the passage of gas thereover at an elevated temperature, and an orifice in the gas exhaust line to control the rate of exhausting gas from the casing to reactivate a portion of the absorbent.

6. A gas dehydrator comprising a dehydrator casing, a mass of silica-gel within the casing, a first conduit opening into the casing near one end of the mass of silica gel, a second conduit opening into the casing at an end of the mass of silica gel spaced from the opening of the first conduit, an outlet in the casing for dehydrated gas, said outlet spaced from and positioned between the openings of the conduits into the casing, a moist gas supply line and a gas exhaust line, valve means adapted to allow flow alternately from the moist gas supply line through the first conduit into the casing to the dehydrated gas outlet and a portion of the gas thus dehydrated from within the casing to the gas exhaust line through the second conduit and then from the moist gas supply line through the second conduit to the dehydrated gas outlet and from the casing through the first conduit to the gas exhaust line, heating means in the casing between the dehydrated gas outlet and the inlet of each of the conduits, and means to actuate the heating means between the opening of the conduit in communication with the gas exhaust line and the dehydrated gas outlet whereby a portion of the silica-gel is used to dehydrate the gas while the remainder of the silica-gel is being reactivated by the passage of gas thereover at an elevated temperature.

7. A gas dehydrator comprising a dehydrator casing, a mass of alumina within the casing, a first conduit opening into the casing near one end of the mass of alumina, a second conduit opening into the casing at an end of the mass of alumina spaced from the opening of the first conduit, an outlet in the casing for dehydrated gas, said outlet spaced from and positioned between the openings of the conduits into the casing, a moist gas supply line and a gas exhaust line, valve means adapted to allow flow alternately from the moist gas supply line through the first conduit into the casing to the dehydrated gas outlet and a portion of the gas thus dehydrated from within the casing to the gas exhaust line through the second conduit and then from the moist gas supply line through the second conduit to the dehydrated gas outlet and from the casing through the first conduit to the gas exhaust line, heating means in the casing between the dehydrated gas outlet and the inlet of each of the conduits, and means to actuate the heating means between the opening of the conduit in communication with the gas exhaust line and the dehydrated gas outlet whereby a portion of the alumina is used to dehydrate the gas while the remainder of the alumina is being reactivated by the passage of gas thereover at an elevated temperature.

8. A gas dehydrator comprising a casing, a bed of moisture absorbent material within the casing, a first conduit opening into the casing at one end of the bed, a second conduit opening into the casing at the other end of the bed, a dehydrated gas outlet from the casing positioned between the openings of the first and second conduit, a heating element extending from the dehydrated gas outlet to each end of the bed, a moist gas supply, a gas exhaust, valve means for selectively connecting the conduits to said moist gas supply and gas exhaust whereby moist gas enters the casing through one conduit and passes through a portion of the bed of absorbent to the dehydrated gas outlet and a portion of the gas is bled through the other conduit to the gas exhaust, timing means actuating said valve means to reverse the direction of flow in the conduits periodically, and means controlling the operation of the heating elements simultaneously with the valve means to heat the portion of gas bled to the gas exhaust for removal of moisture from the absorbent.

9. A gas dehydrator comprising a casing containing a moisture absorbent material therein, a first conduit opening into the casing at one end thereof, a second conduit opening into the casing at an opposite end thereof, a dehydrated gas outlet in the casing positioned between the openings of said first and second conduit, a heating element in each of the ends of the casing between the dehydrated gas outlet and the openings of the first and second conduit, a moist gas supply, a gas exhaust, valve means for selectively connecting the conduits to said moist gas supply and gas exhaust, said valve means adapted to direct gas from the moist gas supply through one conduit into the casing and through the absorbent to the dehydrated gas outlet and simultaneously bleed a minor portion of the gas thus directed into the casing through the other conduit to the gas exhaust, said valve means adapted to reverse the direction of flow in the conduits periodically and means controlling the operation of the heating elements simultaneously with the valve means so constructed and arranged that the heating element between the dehydrated gas outlet and the conduit communicating with the gas exhaust is actuated to heat and activate the portion of the absorbent over which the gas is bled from the system.

10. A gas dehydrator comprising a casing containing a moisture absorbent material therein, a first conduit opening into the casing at one end thereof, a second conduit opening into the casing at an opposite end thereof, a dehydrated gas outlet in the casing positioned between the openings of said first and second conduit, a heating element in each of the ends of the casing between the dehydrated gas outlet and the openings of the first and second conduit, a moist gas supply, a gas exhaust, valve means for selectively connecting the conduits to said moist gas supply and gas exhaust, said valve means adapted to direct gas from the moist gas supply through one conduit into the casing and through the absorbent to the dehydrated gas outlet and simultaneously bleed a portion of the gas thus directed into the casing through the other conduit to the gas exhaust, said valve means adapted to reverse the direction of flow in the conduits periodically, and means controlling the operation of the heating elements simultaneously with the valve means so constructed and arranged that the heating element between the dehydrated gas outlet and the conduit communicating with the gas exhaust is actuated to heat and activate the portion of the absorbent over which the gas is bled from the system.

11. A gas dehydrator comprising a U-shaped casing, a bed of moisture absorbent material within the casing, a dehydrated gas outlet at the base of the U, a first conduit opening into the end of one leg of the U, a second conduit opening into the end of the other leg of the U, a moist gas supply line communicating with the conduits, a gas exhaust line communicating with the conduits, valve means for selectively connecting the conduits to said moist gas supply line and said gas exhaust line, and directing a flow of moist gas through one conduit into the casing and downwardly through the absorbent to the dehydrated gas outlet at the base of the U and simultaneously withdrawing a portion of the dehydrated gas upwardly through the opposite leg of the U to the second conduit and therethrough to the gas exhaust line, said valve means adapted to reverse the direction of flow in the conduits, a heating element in each leg of the U, and a timer periodically operating the valve means to reverse the flow in the conduits, said timer also actuating the heating element in the leg of the casing through which the portion of dehydrated gas flows upwardly to the conduit in communication with the gas exhaust line.

JOSEPH RUSSELL RILEY.

REFERENCES CITED

The following references are of record in the file of this patent:

UNITED STATES PATENTS

| Number | Name | Date |
|---|---|---|
| 1,418,363 | Coggeshall et al. | June 6, 1922 |
| 2,396,809 | Addison | Mar. 19, 1946 |
| 2,535,902 | Dailey | Dec. 26, 1950 |